US010961689B2

(12) United States Patent
Iwamoto et al.

(10) Patent No.: US 10,961,689 B2
(45) Date of Patent: Mar. 30, 2021

(54) SMALL-SIZED CONSTRUCTION MACHINE WITH HEAT EXCHANGER COVER

(71) Applicant: Hitachi Construction Machinery Tierra Co., Ltd., Koka (JP)

(72) Inventors: Yohei Iwamoto, Shiga (JP); Junya Kawamoto, Moriyama (JP); Hiroshi Tabeta, Konan (JP)

(73) Assignee: Hitachi Construction Machinery Tierra Co., Ltd, Koka (JP)

( * ) Notice: Subject to any disclaimer, the term of this patent is extended or adjusted under 35 U.S.C. 154(b) by 650 days.

(21) Appl. No.: 15/757,840

(22) PCT Filed: Sep. 7, 2016

(86) PCT No.: PCT/JP2016/076315
§ 371 (c)(1),
(2) Date: Mar. 6, 2018

(87) PCT Pub. No.: WO2017/126155
PCT Pub. Date: Jul. 27, 2017

(65) Prior Publication Data
US 2020/0232184 A1 Jul. 23, 2020

(30) Foreign Application Priority Data

Jan. 20, 2016 (JP) .............................. JP2016-009063

(51) Int. Cl.
*E02F 9/08* (2006.01)
*B60K 11/04* (2006.01)
(Continued)

(52) U.S. Cl.
CPC ............ *E02F 9/0891* (2013.01); *B60K 11/04* (2013.01); *B62D 25/12* (2013.01); *E02F 3/325* (2013.01);
(Continued)

(58) Field of Classification Search
None
See application file for complete search history.

(56) References Cited

U.S. PATENT DOCUMENTS

2010/0219008 A1\* 9/2010 Isaka ..................... E02F 9/0891
180/68.1

FOREIGN PATENT DOCUMENTS

JP 2000-80676 A 3/2000
JP 2002-70075 A 3/2002
(Continued)

OTHER PUBLICATIONS

Korean-language Office Action issued in counterpart Korean Application No. 1020187006472 dated Aug. 5, 2019 with English translation (10 pages).
(Continued)

*Primary Examiner* — Gerald McClain
(74) *Attorney, Agent, or Firm* — Crowell & Moring LLP

(57) ABSTRACT

An engine cover (23) is provided between a counterweight (7) and a rear surface part (15B) of a cab (15) to be capable of opening/closing in an upper-lower direction and a heat exchanger cover (28) is provided between the rear side of a left side surface part (15C) and a right side surface part (15D) of the cab (15) and a revolving frame (6). The heat exchanger cover (28) is formed of a horizontal-opening structure of being rotatable in a front-rear direction to the revolving frame (6) with a front end (28C) in the front-rear direction as a fulcrum and a rear end (28D) in the front-rear direction as a free end. A heat exchanger cover lock mechanism (32) is provided on the rear end side of the heat exchanger cover (28) to hold the heat exchanger cover (28) in a closed state, and in a state where both the heat exchanger cover (28) and the engine cover (23) are closed, the engine cover (23) covers the rear end (28D) of the heat exchanger
(Continued)

cover (28) and the heat exchanger cover lock mechanism (32) from backward.

5 Claims, 11 Drawing Sheets

(51) Int. Cl.
| | |
|---|---|
| *B62D 25/12* | (2006.01) |
| *E02F 3/32* | (2006.01) |
| *E02F 9/12* | (2006.01) |
| *E02F 9/16* | (2006.01) |
| *E02F 9/18* | (2006.01) |

(52) U.S. Cl.
CPC .......... *E02F 9/0808* (2013.01); *E02F 9/0866* (2013.01); *E02F 9/121* (2013.01); *E02F 9/16* (2013.01); *E02F 9/18* (2013.01)

(56) References Cited

FOREIGN PATENT DOCUMENTS

| | | | |
|---|---|---|---|
| JP | 2002-321651 A | | 11/2002 |
| JP | 2005282111 A | * | 10/2005 ............ E02F 9/0891 |
| JP | 2006-82661 A | | 3/2006 |
| JP | 2010-168739 A | | 8/2010 |
| JP | 2011-69189 A | | 4/2011 |

OTHER PUBLICATIONS

International Search Report (PCT/ISA/220 & PCT/ISA/210) issued in PCT Application No. PCT/JP2016/076315 dated Oct. 18, 2016 with English translation (seven pages).

Japanese-language Written Opinion (PCT/ISA/237) issued in PCT Application No. PCT/JP2016/076315 dated Oct. 18, 2016 (three pages).

Extended European Search Report issued in counterpart European Application No. 16886395.9 dated Jul. 8, 2019 (eight pages).

* cited by examiner

SMALL-SIZED CONSTRUCTION MACHINE WITH HEAT EXCHANGER COVER

TECHNICAL FIELD

The present invention relates to small-sized construction machines such as hydraulic excavators, for example, and particularly, to a small-sized construction machine that is provided with a cover for covering an engine, a heat exchanger and the like to be capable of opening/closing.

BACKGROUND ART

In general, a hydraulic excavator that is a representative example of construction machines is provided with an automotive lower traveling structure, and an upper revolving structure that is rotatably mounted on the lower traveling structure. A working mechanism is tiltably provided in the front side of the upper revolving structure, and an excavating work of earth and sand and the like are performed by using this working mechanism.

The upper revolving structure of the hydraulic excavator has a revolving frame that is formed as a support structure, and this revolving frame is provided thereon with mount equipment devices, such as an engine, a hydraulic pump and a heat exchanger and the like. The upper revolving structure is provided with an opening/closing type cover that covers various kinds of mount equipment devices to be capable of opening/closing. A worker can perform maintenance works such as inspection and maintenance to the engine and the heat exchanger by opening this opening/closing type cover.

Here, a side cover for covering the mount equipment device in a left-right direction has one end side in a front-rear direction that is usually supported by the revolving frame via a hinge mechanism and the other end side in the front-rear direction that acts as a free end. Accordingly, the side cover has a horizontal-opening structure of being rotatable in the front-rear direction (horizontal direction). This side cover is provided with a lock mechanism, which enables the side cover to be held (locked) in a closed state (refer to Patent Document 1).

PRIOR ART DOCUMENT

Patent Document

Patent Document 1: Japanese Patent Laid-Open No. 2002-321651 A

SUMMARY OF THE INVENTION

However, the aforementioned side cover having the horizontal-opening structure cannot hold the closed state thereof in a case where a failure of the lock mechanism or the like occurs, for example. As a result, there is a possibility that the side cover opens inadvertently by a revolving movement of the upper revolving structure and therefore, the side cover collides with obstacles in the circumference to be damaged.

On the other hand, a small-sized hydraulic excavator called a mini-excavator is loaded on a small-sized truck to be transported to a working site and is used for a demolition work of the inside of a building, an excavating work in a narrow area such as an urban area, and the like. Therefore, a total weight of the small-sized hydraulic excavator is suppressed to approximately 0.7 to 8 tons, for example. Accordingly, in such a small-sized hydraulic excavator, the upper revolving structure is sized to be small and a space for arranging the mount equipment device on the revolving frame is small. Therefore, in the small-sized hydraulic excavator, an operating space at the time of operating the lock mechanism provided in the cover that covers the mount equipment device to be capable of opening/closing is narrow, leading to a problem that workability of the maintenance work is worsened.

The present invention is made in view of the aforementioned problems in the conventional art, and an object of the present invention is to provide a small-sized construction machine that can hold a cover for covering a mount equipment device in a closed state.

(1) In order to solve the aforementioned problems, the present invention is applied to a small-sized construction machine comprising: an automotive lower traveling structure; an upper revolving structure that is rotatably mounted on the lower traveling structure; and a working mechanism that is provided in the front side of the upper revolving structure, wherein the upper revolving structure includes: a revolving frame that is formed as a support structural body; a counterweight that is mounted in the rear side of the revolving frame for acting as a weight balance to the working mechanism; an engine that is positioned in the front side to the counterweight and is mounted on the revolving frame in a horizontal state of extending in a left-right direction; a cooling fan that is provided on one side of the engine in the left-right direction to suck in outside air as cooling air; a heat exchanger that is positioned upstream of the cooling fan in a flow direction of the cooling air and is mounted on the revolving frame to cool fluid by the cooling air; a stepped boxy cab that is provided on the revolving frame and has a recessed part formed by notching a rear side of a side surface and a rear surface; an engine cover that is provided between the counterweight and the rear surface of the cab to be capable of opening/closing in an upper-lower direction for inspection of the engine; and a heat exchanger cover that is provided between the rear side of the side surface of the cab and the revolving frame to be capable of opening/closing for inspection of the heat exchanger.

In addition, the present invention is characterized in that: the heat exchanger cover is formed of a horizontal-opening structure of being rotatable to the revolving frame with a front end in a front-rear direction as a fulcrum and a rear end in the front-rear direction as a free end; and a lock mechanism is provided on a rear end side of the heat exchanger cover to hold the heat exchanger cover in a closed state, wherein in a state where both the heat exchanger cover and the engine cover are closed, the engine cover covers the rear end of the heat exchanger cover and the lock mechanism from backward.

According to the present invention, in a state where both the heat exchanger cover and the engine cover are closed, it is possible to hold the rear end of the heat exchanger cover of the horizontal-opening structure with the engine cover. Accordingly, even in a case where the heat exchanger cover is not locked in the closed state, for example, because of a failure of the lock mechanism or the like, the rear end of the heat exchanger cover is held by the engine cover, thus making it possible to suppress the heat exchanger cover from rotating in the front-rear direction (horizontal direction) by the revolving movement of the upper revolving structure. As a result, it is possible to suppress the heat exchanger cover from opening inadvertently at the revolving movement time to interfere with surrounding obstacles.

MODE FOR CARRYING OUT THE INVENTION

Hereinafter, a small-sized hydraulic excavator taken as a representative example of small-sized construction machines according to an embodiment in the present invention will be in detail explained with reference to FIG. 1 to FIG. 12.

Figure 1:
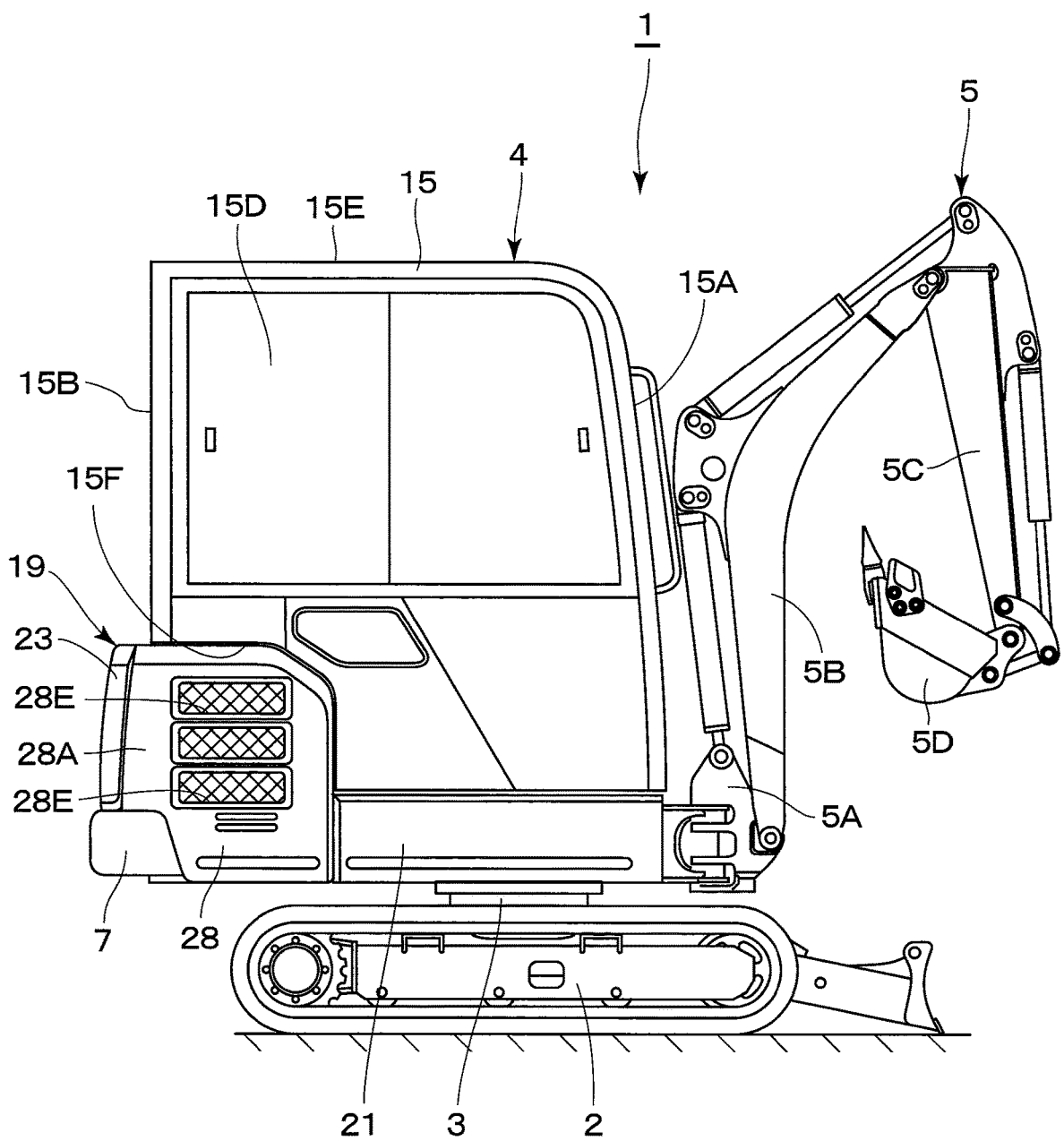
FIG. 1 is a front view showing a small-sized hydraulic excavator according to an embodiment in the present invention.

In FIG. 1, a small-sized hydraulic excavator 1 is provided with an automotive lower traveling structure 2 of a crawler type, and an upper revolving structure 4 that is rotatably mounted on the lower traveling structure 2 through a revolving device 3. A swing type working mechanism 5, which includes a swing post 5A, a boom 5B, an arm 5C, a bucket 5D and the like, is provided in the front side of the upper revolving structure 4 to be capable of swinging in a left-right direction, and this working mechanism 5 is used to perform an excavating work of earth and sand, and the like. Here, the small-sized hydraulic excavator 1 is loaded on a small-sized truck to be transported to a working site and is used for a demolition work of the inside of a building, an excavating work in a narrow area of an urban area or the like. Therefore, a total weight of the small-sized hydraulic excavator 1 is suppressed to approximately 0.7 to 8 tons, for example.

The upper revolving structure 4 includes a revolving frame 6, a counterweight 7, an engine 8, a heat exchanger 10, a support member 14, a cab 15 and an exterior cover 19, which will be described later. Here, since the small-sized hydraulic excavator 1 is applied to a narrow working site such as the inside of a building or an urban area, for example, the upper revolving structure 4 is formed to be small. Therefore, in the hydraulic excavator 1, a space for arranging various kinds of mounted equipment on the revolving frame 6 is narrow, and a rear position of the cab 15 is arranged on the upper side of the engine 8 and the heat exchanger 10.

Figure 4:
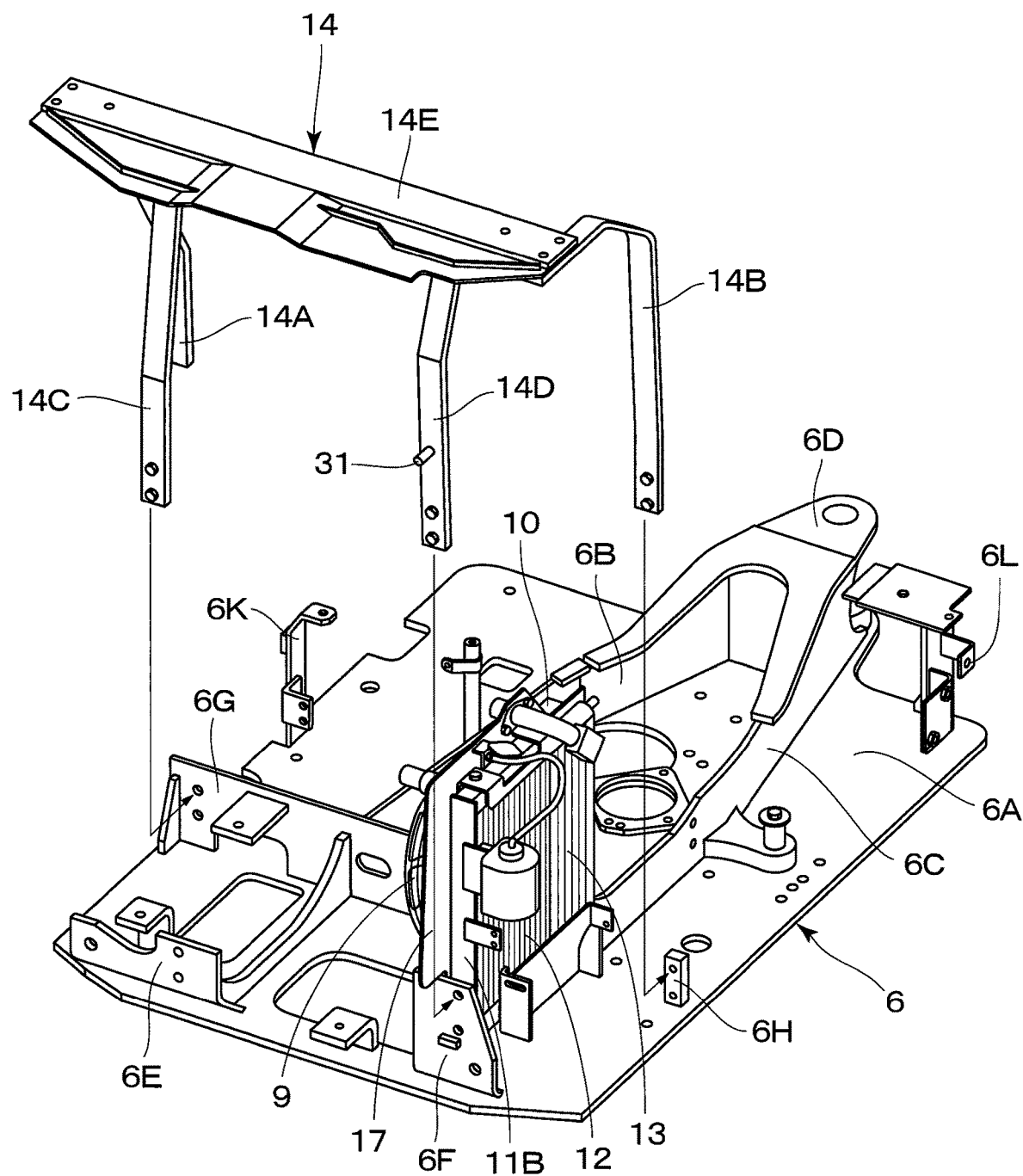
FIG. 4 is an exploded perspective view showing a revolving frame and a support member.
Figure 7:
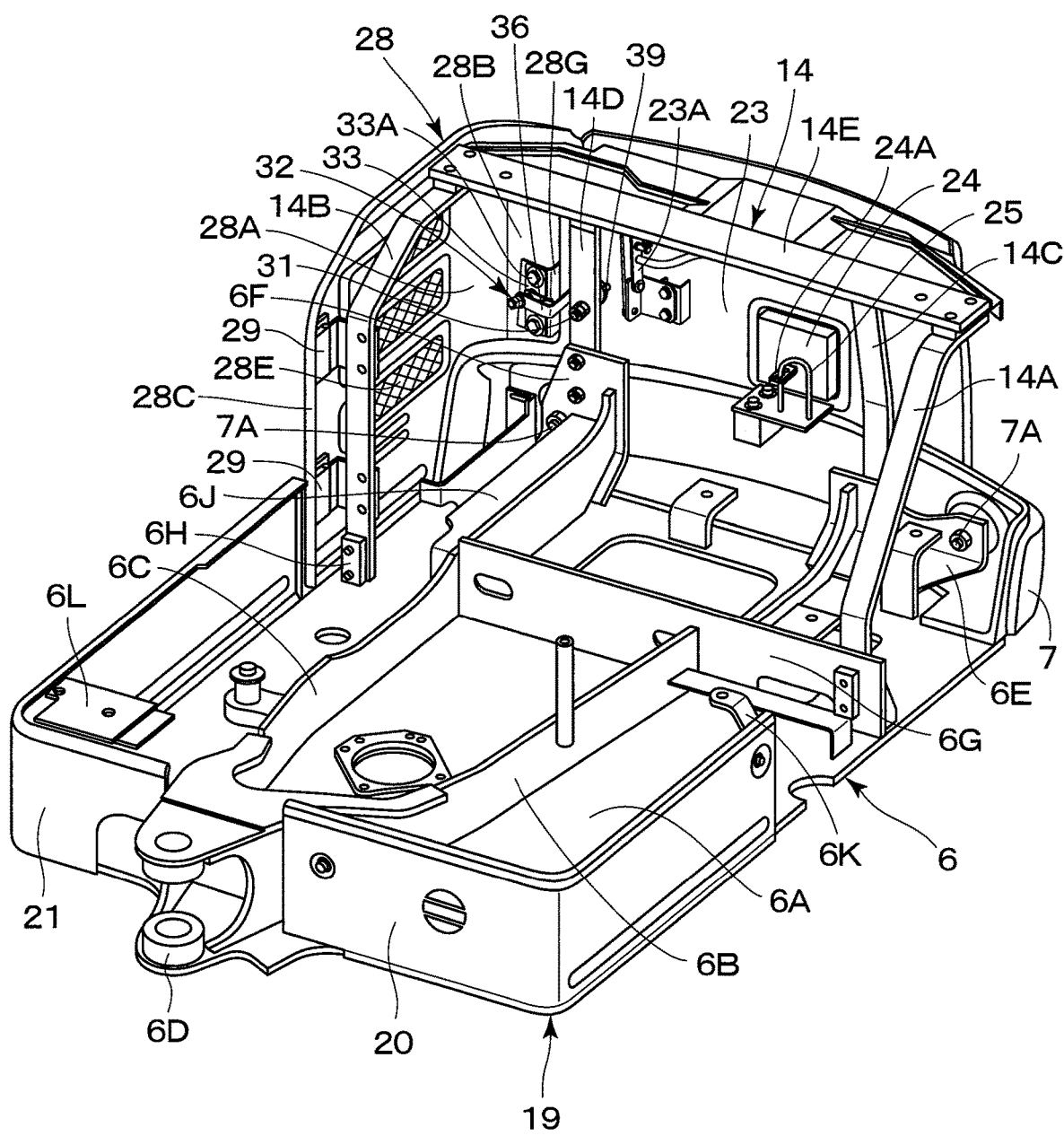
FIG. 7 is a perspective view showing a state where the engine cover and the heat exchanger cover are mounted on the revolving frame as viewed from the left forward side.

The revolving frame 6 is rotatably provided on the lower traveling structure 2 through the revolving device 3. The revolving frame 6 is formed as a support structural body and acts as a base of the upper revolving structure 4. As shown in FIG. 4 and FIG. 7, the revolving frame 6 includes a bottom plate 6A formed in a rectangular shape to extend in a front-rear direction by using a thick steel plate or the like, and a left vertical plate 6B and a right vertical plate 6C arranged vertically to extend in the front-rear direction on the bottom plate 6A.

A support bracket 6D is provided in a front end part of each of the left vertical plate 6B and the right vertical plate 6C. The support bracket 6D swingably supports the swing post 5A provided in the base end of the working mechanism 5 in the left-right direction. A left rear bracket 6E and a right rear bracket 6F are provided in rear end parts of the left vertical plate 6B and the right vertical plate 6C. The counterweight 7 to be described later is mounted in the left rear bracket 6E and the right rear bracket 6F, and a left rear leg part 14C and a right rear leg part 14D of the support member 14 to be described later are mounted therein.

A horizontal plate 6G is vertically arranged in the intermediate part of the bottom plate 6A in the front-rear direction to extend in the left-right direction across the intermediate part of the left vertical plate 6B in the front-rear direction. The horizontal plate 6G extends to a left end edge part of the bottom plate 6A over the left vertical plate 6B from the right vertical plate 6C. A left front leg part 14A of the support member 14 is mounted in a left end part of the horizontal plate 6G. A support-member support bracket 6H erecting upward from the bottom plate 6A is mounted in a right end part of the bottom plate 6A positioned on an extension line of the horizontal plate 6G. A right front leg part 14B of the support member 14 is mounted in the support-member support bracket 6H.

A heat exchanger support base 6J is provided in the vicinity of a part of the bottom plate 6A in which the right vertical plate 6C and the right rear bracket 6F cross to extend along the right vertical plate 6C in the front-rear direction (refer to FIG. 7). The heat exchanger 10 to be described later is mounted on the heat exchanger support base 6J. A left cover bracket 6K is provided in a left end part of the bottom plate 6A positioned ahead of the horizontal plate 6G to extend upward. A left front cover 20 to be described later is mounted in the left cover bracket 6K. In addition, a right front cover bracket 6L is provided in a right front part of the bottom plate 6A to extend upward. A right front cover 21 to be described later is mounted in the right front cover bracket 6L.

The counterweight 7 is mounted on the rear end of the revolving frame 6. The counterweight 7 acts as a weight balance to the working mechanism 5, and is formed as a heavy load in a convex curved shape. The counterweight 7 is mounted in the left rear bracket 6E and the right rear bracket 6F in the revolving frame 6 respectively by using bolts 7A. Here, a left corner part and a right corner part of the counterweight 7 respectively are chamfered in an arc shape not to become angular. Accordingly, the counterweight 7 can avoid interference with the surrounding obstacles at the revolving movement of the upper revolving structure 4.

The engine 8 is mounted closer to the rear side of the horizontal plate 6G of the revolving frame 6. The engine 8 is arranged on the revolving frame 6 in a horizontal state where a crank shaft (not shown) extends in the left-right direction. A hydraulic pump (not shown) is provided in the left side to the engine 8. The hydraulic pump is driven by the engine 8 to deliver pressurized oil toward various kinds of hydraulic actuators mounted on the hydraulic excavator 1.

A cooling fan 9 is provided in the right side as one side in the left-right direction to the engine 8. The cooling fan 9 rotates adopting the engine 8 as a power source to suck in outside air as cooling air, and supplies the cooling air to the heat exchanger 10 to be described later.

Figure 6:
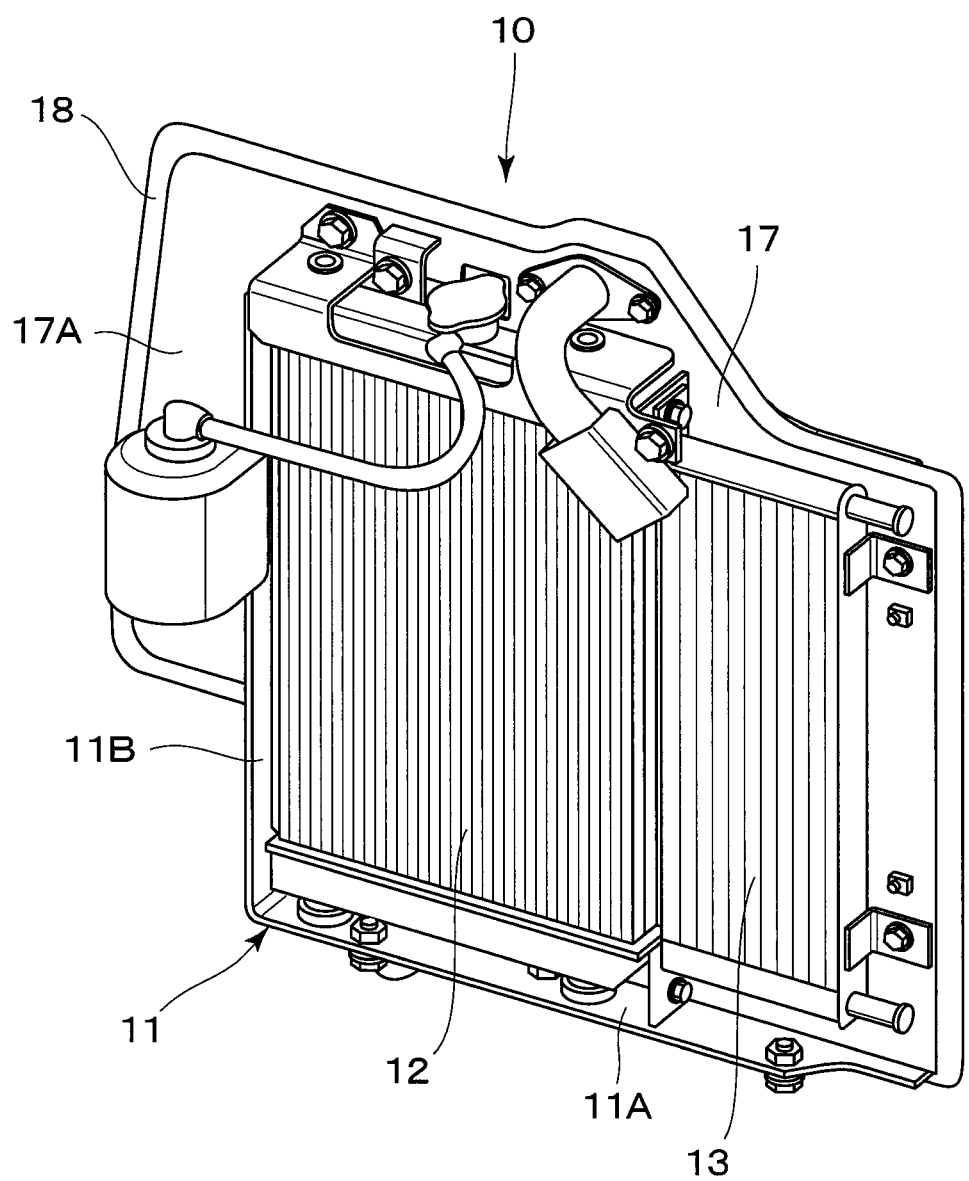
FIG. 6 is a perspective view showing a heat exchanger as a single unit.

The heat exchanger 10 is positioned upstream side of the cooling fan 9 in a flowing direction of the cooling air and is provided on the revolving frame 6. The heat exchanger 10, as shown in FIG. 6, includes a frame body 11, a radiator 12 and an oil cooler 13, which will be described later. The heat exchanger 10 is mounted on the heat exchanger support base 6J of the revolving frame 6 and extends along the right vertical plate 6C in the front-rear direction.

The frame body 11 configures an outer shell of the heat exchanger 10, and supports the radiator 12, the oil cooler 13 and the like integrally. The frame body 11 is formed in a rectangular frame shape as a whole by performing bending work to a steel plate member, for example. The frame body 11 includes a bottom plate 11A extending in the front-rear direction, and a rear plate 11B arranged in the rear side of the bottom plate 11A and extending in the upper-lower direction. The rear plate 11B configures the rear end of the heat exchanger 10. The heat exchanger 10 is arranged vertically on the revolving frame 6 by mounting the bottom plate 11A of the frame body 11 on the heat exchanger support base 6J of the revolving frame 6 using a plurality of bolts.

The bottom plate 11A of the frame body 11 is provided with the radiator 12 and the oil cooler 13 mounted to line up in parallel to a flow of cooling air. That is, the radiator 12 and the oil cooler 13 are mounted on the frame body 11 to line up in the front-rear direction. In this state, a partition member 17 to be described later is mounted in the frame body 11 to extend from the surroundings of the radiator 12 and the oil cooler 13.

The radiator 12 is mounted to the frame body 11 in a position closer to the rear plate 11B. The radiator 12 faces the cooling fan 9 in the left-right direction. The radiator 12 is arranged to extend in the front-rear direction such that the flowing direction of the cooling air becomes the left-right direction. The radiator 12 is connected to a water jacket (not shown) of the engine 8. The radiator 12 is to cool engine cooling water, a temperature of which has increased by cooling the engine 8, by cooling air.

The oil cooler 13 is mounted to the frame body 11 to be adjacent to the front side of the radiator 12. The oil cooler 13 faces the cooling fan 9 in the left-right direction. The oil cooler 13, as similar to the radiator 12, is arranged to extend in the front-rear direction such that the flowing direction of the cooling air becomes the left-right direction. The oil cooler 13 cools the hydraulic oil, which is returned from various kinds of hydraulic actuators mounted on the hydraulic excavator 1 and a temperature of which has increased and, by cooling air, and the cooled hydraulic oil is circulated to an hydraulic oil tank.

Figure 5:
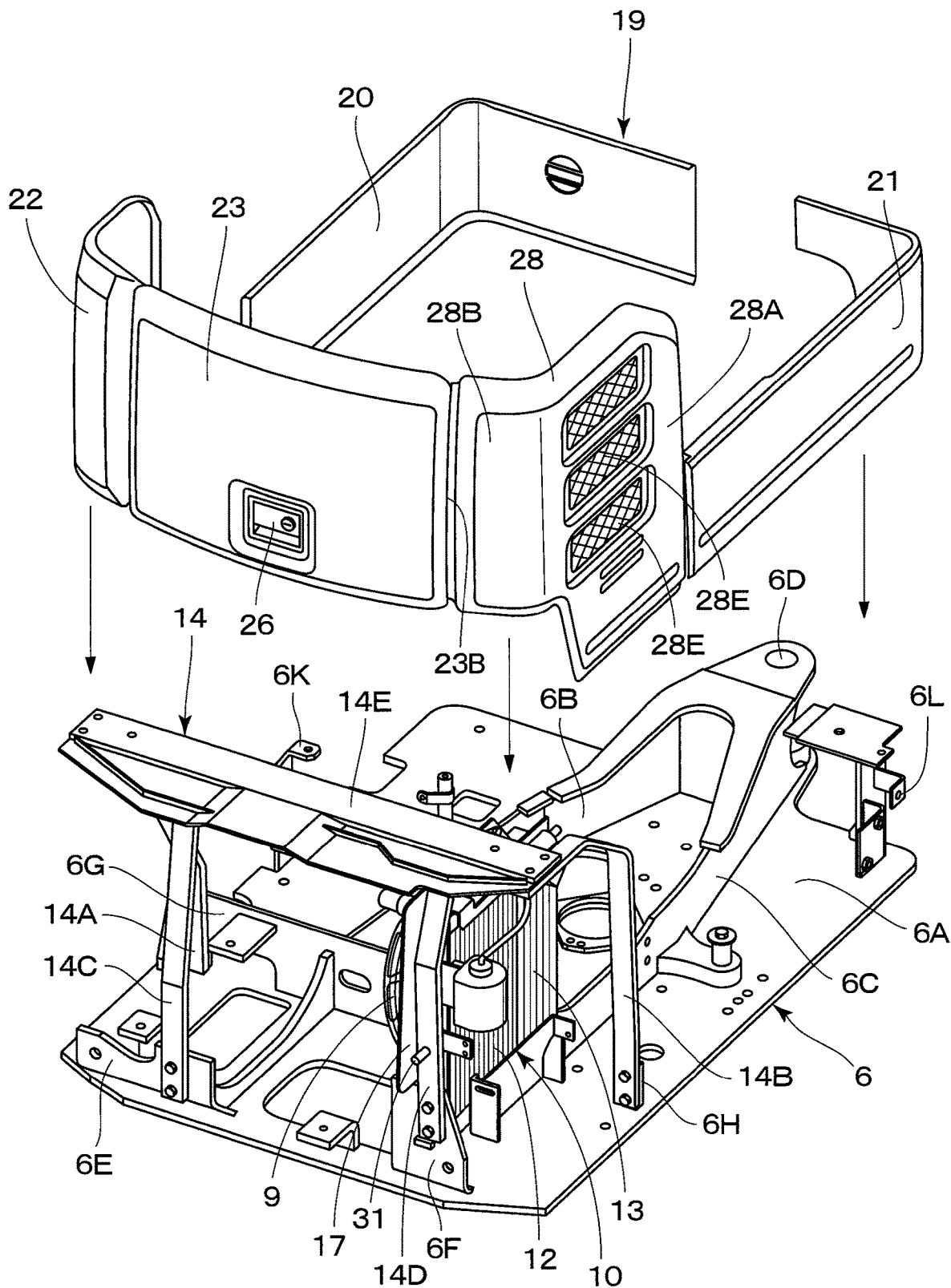
FIG. 5 is an exploded perspective view showing the revolving frame and an exterior cover.

The support member 14 is arranged closer to the rear side than the horizontal plate 6G of the revolving frame 6 and is mounted to the revolving frame 6 to bridge over the engine 8 and the heat exchanger 10. The support member 14 supports the rear side of the cab 15 to be described later and is configured for a base of an operator's seat (any of them is not shown) arranged in the inside of the cab 15 to be mounted thereon. As shown in FIG. 4 and FIG. 5, the support member 14 includes the left front leg part 14A, the right front leg part 14B, the left rear leg part 14C, the right rear leg part 14D and a support base 14E mounted on the upper end of each of the leg parts 14A, 14B, 14C, 14D.

A lower end of the left front leg part 14A is bolted to a left end part of the horizontal plate 6G configuring part of the revolving frame 6. An upper end of the left front leg part 14A is inclined obliquely toward the backward side. A lower end of the right front leg part 14B is bolted to the support-member support bracket 6H of the revolving frame 6. An upper end of the right front leg part 14B is inclined obliquely toward the backward side. On the other hand, a lower end of the left rear leg part 14C is bolted to the left rear bracket 6E of the revolving frame 6. An upper end of the left rear leg part 14C extends upward. A lower end of the right rear leg part 14D is bolted to the right rear bracket 6F of the revolving frame 6. An upper end of the right rear leg part 14D extends upward. Here, a fastening tool 31 to be described later is provided in the intermediate part of the right rear leg part 14D in the upper-lower direction to project toward the backward side.

The support base 14E is fixed to an upper end of each of the left front leg part 14A, the right front leg part 14B, the left rear leg part 14C and the right rear leg part 14D. The support base 14E has a length dimension substantially equal to a width dimension of the revolving frame 6 in the left-right direction, and connects the upper ends of the leg parts 14A, 14B, 14C, 14D with each other. The support base 14E extends in the left-right direction above the engine 8 and the heat exchanger 10, and supports the rear side of the cab 15 on the upper side to the engine 8 and the heat exchanger 10.

Figure 2:
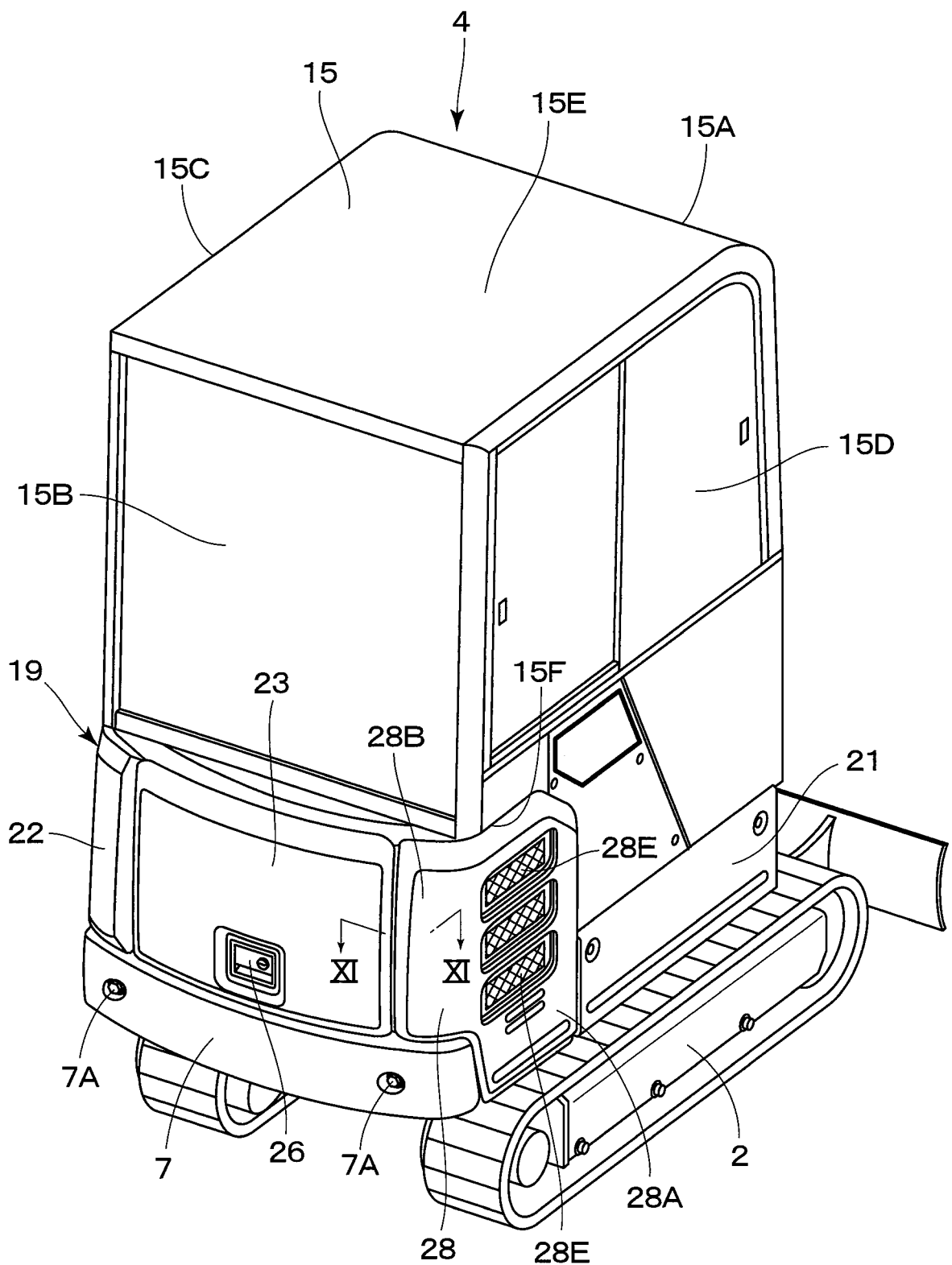
FIG. 2 is a perspective view showing the hydraulic excavator in a state where a working mechanism is removed as viewed from the right backward side.
Figure 3:
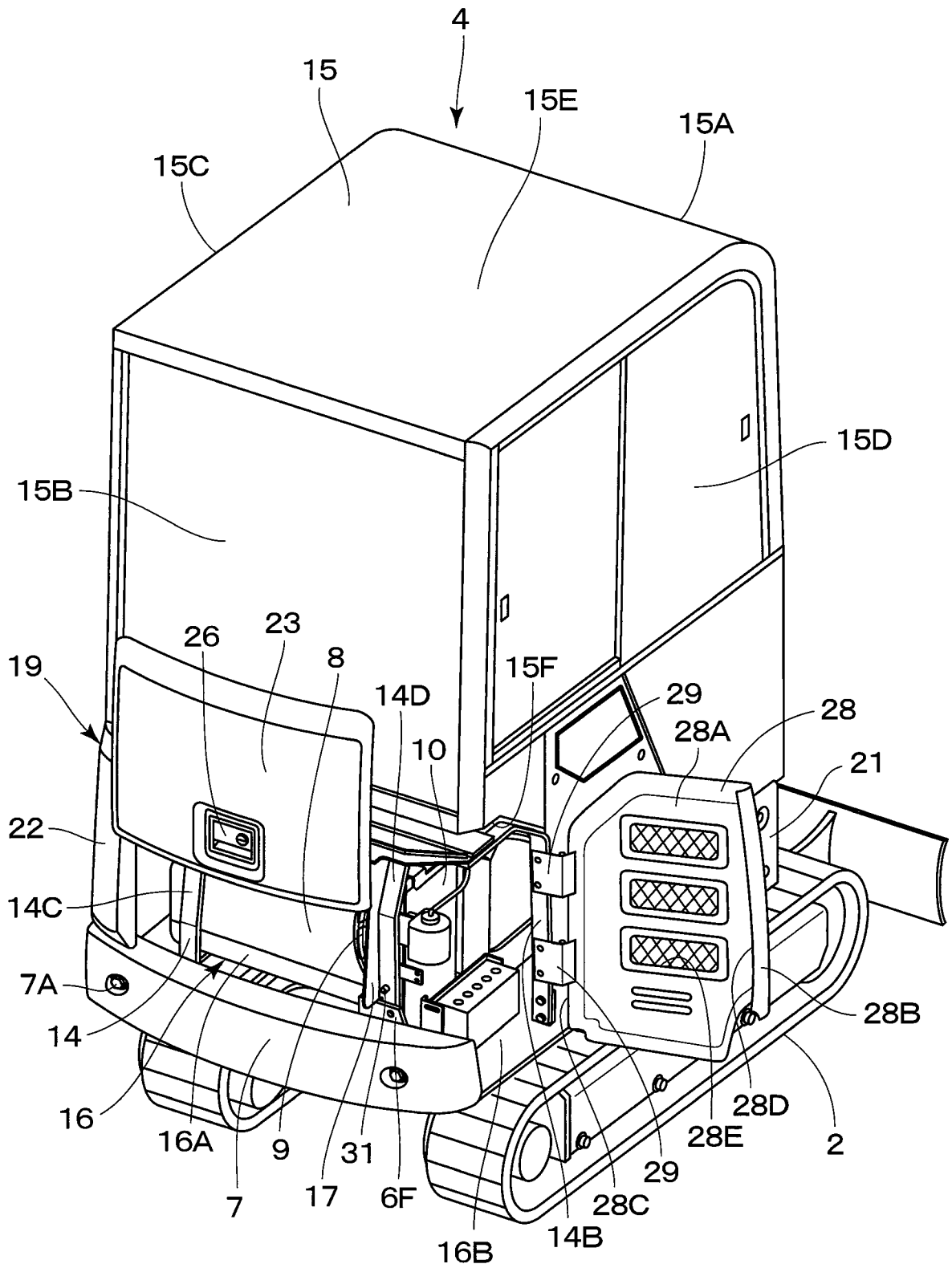
FIG. 3 is a perspective view showing the hydraulic excavator in a state where an engine cover and a heat exchanger cover in the hydraulic excavator are opened as viewed in a position similar to FIG. 2.

The cab 15 is mounted on the revolving frame 6 in a state of covering the revolving frame 6 over a substantially entire region from above to define an operator's room. The cab 15 has a length dimension in the front-rear direction having 70% to 90% or more of the upper revolving structure 4 in the front-rear direction, for example. Accordingly, occupant comfort in the inside of the cab 15 is enhanced in the small-sized hydraulic excavator 1. As shown in FIG. 1 to FIG. 3, the cab 15 is formed in a boxy shape to be surrounded by a front surface part 15A, a rear surface part 15B facing the front surface part 15A in the front-rear direction, a left side surface part 15C positioned in the left side between the front surface part 15A and the rear surface part 15B, a right side surface part 15D facing the left side surface part 15C and an upper surface part 15E for closing an upper end of each of the front surface part 15A, the rear surface part 15B, the left side surface part 15C and the right side surface part 15D. Further, a recessed part 15F recessed toward the upper side and the front side is formed in a rear lower side of the cab 15, and the cab 15 is formed in a stepped boxy shape as a whole.

In a state where the cab 15 is mounted on the revolving frame 6, the recessed part 15F in the rear side of the cab 15 is supported by the support base 14E of the support member 14 and covers the engine 8 and the heat exchanger 10 from above. Accordingly, the cab 15 is mounted on the revolving frame 6 in a state of covering the revolving frame 6 over a substantially entire region from above, thus making it possible to largely secure a residence space in the inside of the cab 15. On the other hand, the space formed between the revolving frame 6 and the cab 15 becomes narrow.

As shown in FIG. 3, an equipment device accommodating room 16 is formed between the bottom plate 6A of the revolving frame 6 and the recessed part 15F of the cab 15 to be covered with the exterior cover 19 to be described later. The equipment device accommodating room 16 is partitioned into an engine room 16A for accommodating the engine 8 and the like and a heat exchanger room 16B for accommodating the heat exchanger 10 and the like across the partition member 17 to be described later. The engine room. 16A is covered with an engine cover 23 to be described later to be capable of opening/closing. The heat exchanger room 16B is covered with a heat exchanger cover 28 to be described later to be capable of opening/closing.

The partition member 17 is provided integrally with the frame body 11 to extend from the surroundings of the radiator 12 and the oil cooler 13 configuring part of the heat exchanger 10 (refer to FIG. 6). That is, the partition member 17 forms an outer peripheral part of the frame body 11. The partition member 17 seals the engine room 16A in a state where the engine cover 23 is closed, and seals the heat exchanger room 16B in a state where the heat exchanger cover 28 is closed. Accordingly, the partition member 17 defines the equipment device accommodating room 16 into the engine room 16A and the heat exchanger room 16B. A seal material 18 formed of an elastic material such as rubber and the like is provided on an outer peripheral edge of the partition member 17. The seal material 18 is to seal a clearance formed between the outer peripheral edge of the partition member 17 and an inner peripheral surface of the engine cover 23 or the like when the engine cover 23 is closed (refer to FIG. 11).

Thereby, the cooling air sucked in the heat exchanger room 16B by the cooling fan 9 passes through the heat exchanger 10, and after that, is supplied to the engine room 16A. Accordingly, the partition member 17 can block penetration of the cooling air into the heat exchanger room 16B from the engine room 16A to prevent the cooling air a temperature of which has increased in the engine room 16A from penetrating into the heat exchanger room 16B. As a result, a low-temperature cooling air is supplied into the heat exchanger room 16B from an exterior.

The exterior cover 19 is arranged on the circumference of the revolving frame 6 between the counterweight 7 and the cab 15. The exterior cover 19 covers mount equipment devices such as the engine 8, the cooling fan 9 and the heat exchanger 10 and the like, which are mounted on the revolving frame 6. As shown in FIG. 2 and FIG. 5, the exterior cover 19 includes the left front cover 20, a right front cover 21, a left rear cover 22, the engine cover 23 and the heat exchanger cover 28 to be described later.

The left front cover 20 has a lower side that is arranged between the left end part and the front end part of the bottom plate 6A configuring part of the revolving frame 6 and an upper side that is arranged between the left side surface part 15C and the front surface part 15A of the cab 15. The left front cover 20 is formed in an L-letter shape extending along the left end part and the front end part of the bottom plate 6A. The left front cover 20 is mounted to the left cover bracket 6K of the revolving frame 6 and the like. On the other hand, the right front cover 21 has a lower side that is arranged between the right end part and the front end part of the bottom plate 6A configuring part of the revolving frame 6 and an upper side that is arranged between the right side surface part 15D and the front surface part 15A of the cab 15. The right front cover 21 is formed in an L-letter shape extending along the right end part and the front end part of the bottom plate 6A. The right front cover 21 is mounted to the right front cover bracket 6L of the revolving frame 6 and the like.

The left rear cover 22 has a lower side that is arranged between the left end part of the bottom plate 6A configuring part of the revolving frame 6 and the counterweight 7 and an upper side that is arranged in a position corresponding to the recessed part 15F of the left side surface part 15C of the cab 15. The left rear cover 22 is formed in an L-letter shape bending along the left end part and the rear end part of the bottom plate 6A. The left front cover 22 is mounted fixedly to a bracket (not shown) provided in the support member 14, for example. The left rear cover 22 covers the engine 8, a hydraulic pump (not shown) and the like accommodated in the engine room 16A from the left side. Here, a left corner part of the left rear cover 22 is chamfered in an arc shape not to become angular. Accordingly, the left corner part of the left rear cover 22 can avoid interference with the surrounding obstacles at the revolving movement of the upper revolving structure 4.

Figure 8:
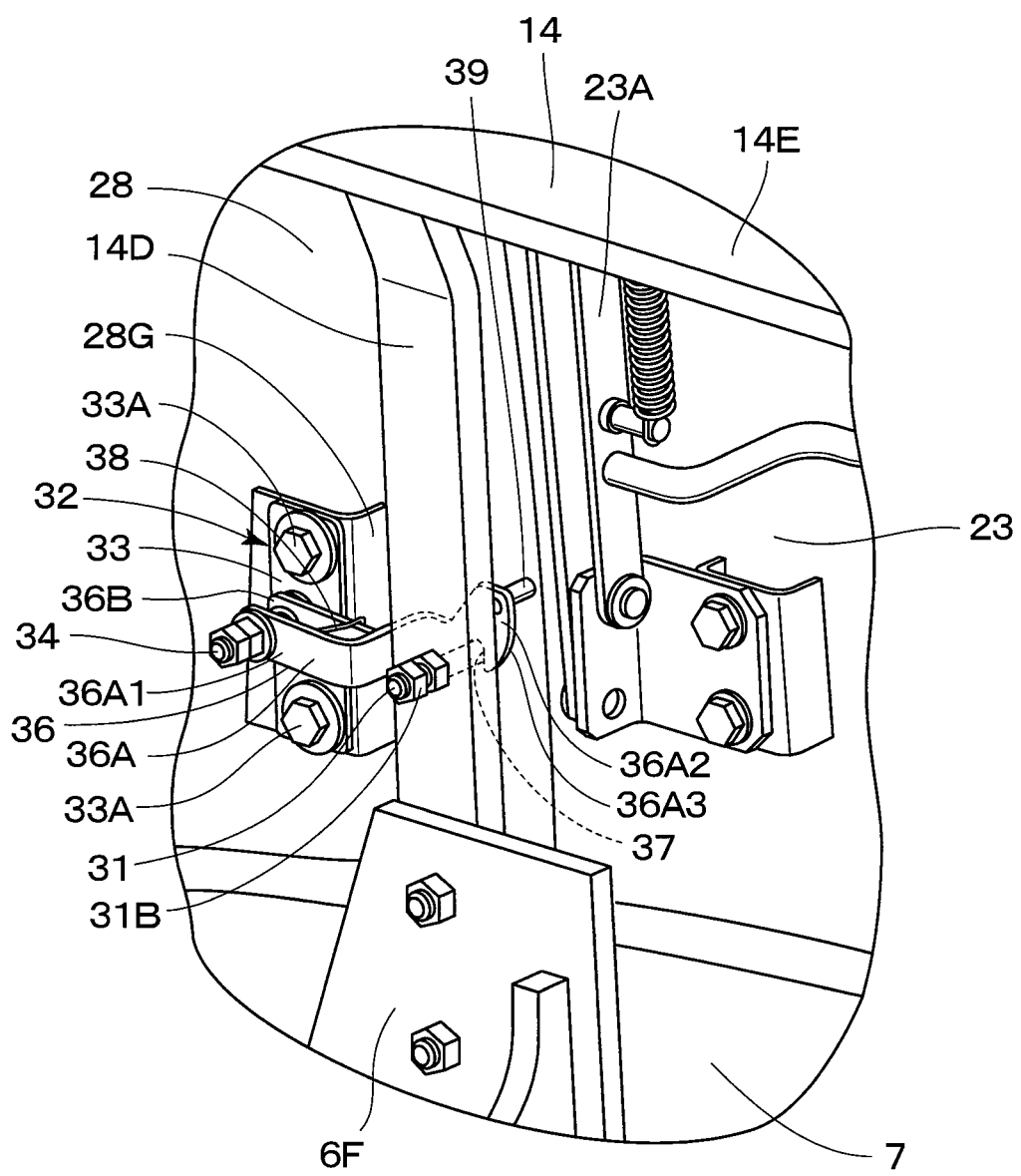
FIG. 8 is a partially enlarged perspective view showing the heat exchanger cover, the lock mechanism, a fastening tool and the like in FIG. 7.
Figure 9:
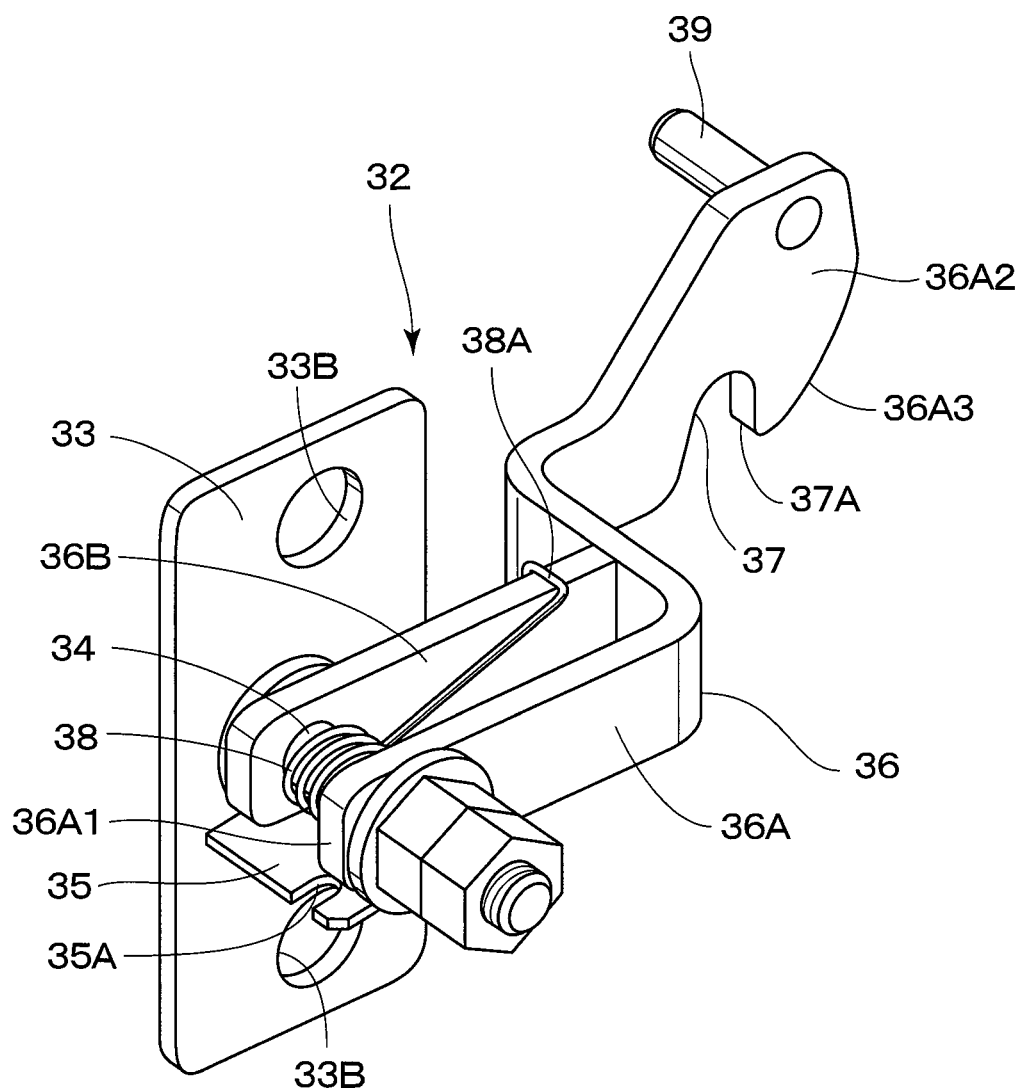
FIG. 9 is a perspective view showing the lock mechanism as a single unit.

The engine cover 23 is arranged between a part of the rear surface part 15B of the cab 15 corresponding to the recessed part 15F and the counterweight 7 to be capable of opening/closing in the upper-lower direction. The engine cover 23 is arranged between the left rear cover 22 and the heat exchanger cover 28, and is bent in an arc shape along the rear surface of the counterweight 7. The engine cover 23 covers the engine 8 accommodated in the engine room 16A, the heat exchanger 10 accommodated in the heat exchanger room 16B, and the like from the rear side. As shown in FIG. 7 and FIG. 8, the engine cover 23 is mounted to the support member 14 through a link mechanism 23A. The engine cover 23 moves in the upper-lower direction between a closed position shown in FIG. 2 and an opened position shown in FIG. 3.

When the engine cover 23 is placed in the closed position as shown in FIG. 2, the engine room 16A is closed by the engine cover 23. On the other hand, when the engine cover 23 is placed in the opened position as shown in FIG. 3, the engine room 16A is released, making it possible to perform a maintenance work to the engine 8 and the like.

Here, as shown in FIG. 7, the engine cover 23 is provided with an engine cover lock mechanism 24 that holds the engine cover 23 in the closed state (closed position). The engine cover lock mechanism 24 has a paw member 24A that projects to the forward side from an inner side surface of the engine cover 23. The paw member 24A is engaged to a reverse U-letter-shaped hook 25 provided in the counterweight 7 when the engine cover 23 is closed. As a result, the engine cover 23 is automatically held in the closed state. On the other hand, a lock release operation tool 26 is provided on an outer side surface of the engine cover 23. The lock release operation tool 26 releases the engaging state of the paw member 24A to the hook 25. The lock release operation tool 26 is operated from the outside of the engine cover 23 in the closed position by using a key (not shown) or the like. Accordingly, the paw member 24A of the engine cover lock mechanism 24 is disengaged from the hook 25, making it possible to open the engine cover 23 upward by the link mechanism 23A.

Figure 11:
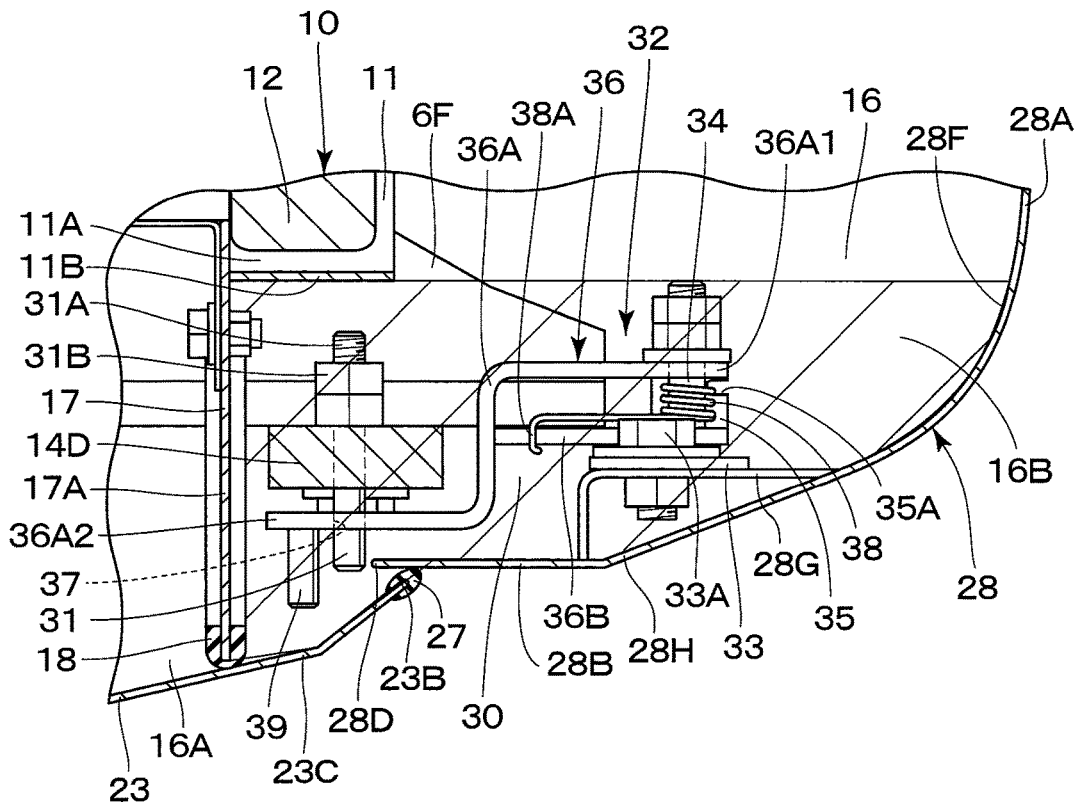
FIG. 11 is a cross sectional view showing a state where the heat exchanger cover is locked in a closed position by the lock mechanism as viewed in a direction of arrows XI-XI in FIG. 2.

Further, as shown in FIG. 11, a seal member 27 formed of an elastic material such as rubber and the like is provided on an outer peripheral edge of the engine cover 23. The seal member 27 seals a clearance to the heat exchanger cover 28 when the engine cover 23 is closed. Accordingly, rainwater, dusts and the like can be suppressed from entering the equipment device accommodating room 16 through the outer peripheral edge of the engine cover 23.

The heat exchanger cover 28 has a lower side that is arranged between the right end part of the bottom plate 6A configuring part of the revolving frame 6 and the counterweight 7 and an upper side that is arranged in a part corresponding to the recessed part 15F of the right side surface part 15D of the cab 15 to be capable of opening/ closing in the front-rear direction. The heat exchanger cover 28 is formed in an L-letter shape along the right end part and the rear end part of the bottom plate 6A. The heat exchanger cover 28 covers the heat exchanger 10 accommodated in the heat exchanger room 16B, and the like from the right side. A right corner part of the heat exchanger cover 28 is chamfered in an arc shape not to become angular. Accordingly, the right corner part of the heat exchanger cover 28 can avoid interference with the surrounding obstacles at the revolving movement of the upper revolving structure 4.

Here, the heat exchanger cover 28 includes a right surface plate 28A and a rear surface plate 28B bent in the left side toward the engine cover 23 from the rear end side of the right surface plate 28A. The right surface plate 28A extends in the front-rear direction in a state of facing the radiator 12 in the heat exchanger 10 and the like. The rear surface plate 28B faces the frame body (rear plate 11B) in the heat exchanger 10 in the front-rear direction. As shown in FIG. 3 and FIG. 7, a front end 28C of the heat exchanger cover 28 (right surface plate 28A) in the front-rear direction is rotatably mounted in the right front leg part 14B of the support member 14 through a hinge member 29. As a result, a rear end 28D of the heat exchanger cover 28 (rear surface plate 28B) becomes a free end. The rear end 28D is rotatable in the front-rear direction (horizontal direction) on a basis of the front end 28C supported by the hinge member 29. Accordingly, the heat exchanger cover 28 is configured to open/close in the horizontal direction between the closed position shown in FIG. 2 and FIG. 11 and the opened position shown in FIG. 3.

Figure 12:
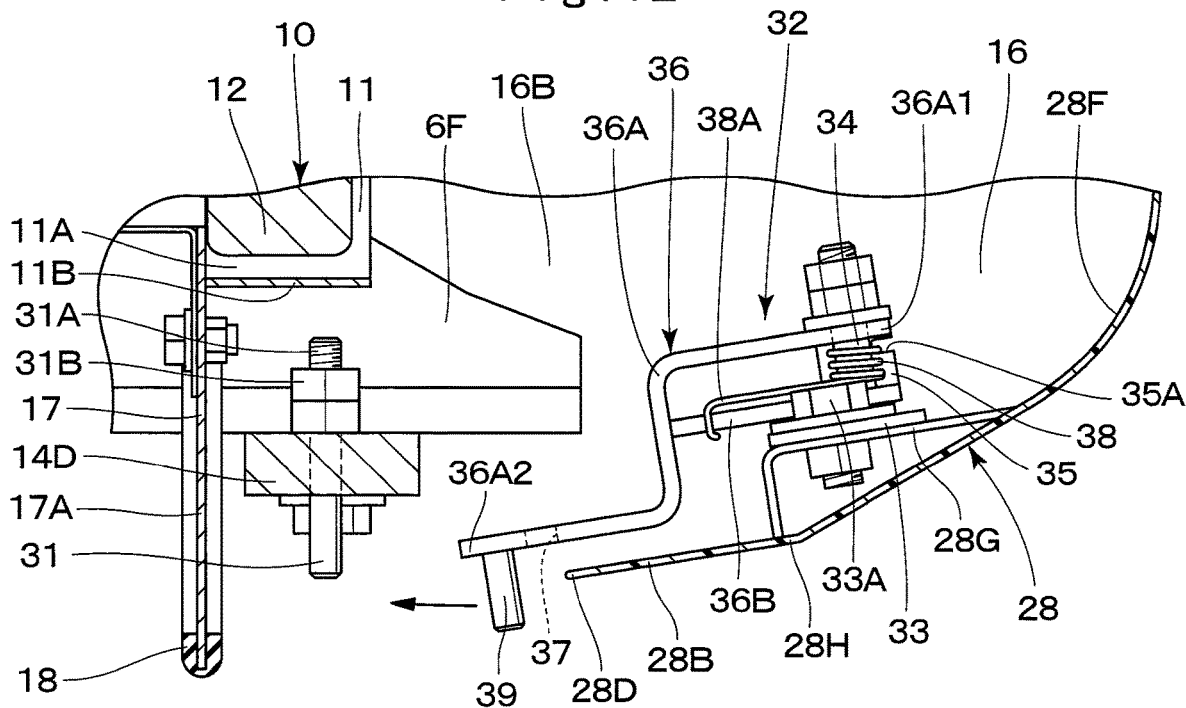
FIG. 12 is a cross sectional view showing a state where the locked state by the lock mechanism is released to open the heat exchanger cover as viewed from a position as similar to FIG. 11.

A plurality of air flowing openings 28E are formed in the right surface plate 28A of the heat exchanger cover 28 to line up in the upper-lower direction. At rotation of the cooling fan 9, outside air is sucked in the inside of the heat exchanger room 16B through each of the air flowing openings 28E. On the other hand, as shown in FIG. 11 and FIG. 12, a plate-shaped mounting seat 28G bent in an L-letter shape is fixed to an inner surface 28F positioned in the inside of a narrow space 30, which will be described later, of the rear surface plate 28B. A heat exchanger cover lock mechanism 32 to be described later is mounted to the mounting seat 28G.

As shown in FIG. 2 and FIG. 11, in a state where both the engine cover 23 and the heat exchanger cover 28 are closed, the rear end 28D of the heat exchanger cover 28 and the heat exchanger cover lock mechanism 32 are covered with the engine cover 23 from backward. That is, the rear end 28D of the heat exchanger cover 28 and a right end 23B of the engine cover 23 overlap in the front-rear direction. As a result, even when the rear end 28D of the heat exchanger cover 28 rotates in the front-rear direction on a basis of the front end 28C, the rear end 28D of the heat exchanger cover 28 abuts on the right end 23B of the engine cover 23. Accordingly, as long as the engine cover 23 is held in the closed state, the heat exchanger cover 28 can be suppressed from opening inadvertently.

On the other hand, as shown by hatching in FIG. 11, in a state where both the engine cover 23 and the heat exchanger cover 28 are closed, the narrow space 30 surrounded by the engine cover 23, the heat exchanger cover 28 and the partition member 17 is formed closer to the rear side than the heat exchanger 10. The narrow space 30 usually acts as a dead space. The right rear leg part 14D of the support member 14 is arranged in the inside of the narrow space 30, as well as the fastening tool 31 to be described later and the heat exchanger cover lock mechanism 32 are provided therein.

More specifically, the narrow space 30 is formed as a space surrounded by an extension part 23C of the engine cover 23, an extension part 28H of the heat exchanger cover 28 and an extension part 17A of the partition member 17. The extension part 23C of the engine cover 23 is a part extended to the heat exchanger room 16B-side from the partition member 17. The extension part 28H of the heat exchanger cover 28 is a part extended closer to the rear side than the rear plate 11B (rear end of the heat exchanger 10) of the frame body 11 configuring part of the heat exchanger 10. The extension part 17A of the partition member 17 is a part extended closer to the rear side than the rear plate 11B of the heat exchanger 10.

The fastening tool 31 is provided in the right rear leg part 14D of the support member 14. In this case, the fastening tool 31 is arranged in a part closer to the upper side than the right rear bracket 6F of the revolving frame 6. The fastening tool 31 is engaged to an engaging groove 37 of a latch 36 to be described later. As shown in FIG. 11, the fastening tool 31 is formed of a columnar shaft body on which a male screw 31A is formed, and is mounted to be removable (replaceable) to the right rear leg part 14D by using bolts 31B. The fastening tool 31 extends backward from the rear surface of the right rear leg part 14D and a tip end of the fastening tool 31 projects into the narrow space 30.

The heat exchanger cover lock mechanism 32 is provided in the rear end side of the heat exchanger cover 28. The heat exchanger cover lock mechanism 32 holds (locks) the heat exchanger cover 28 in the closed state. As shown in FIG. 7 to FIG. 11, the heat exchanger cover lock mechanism 32 includes a mounting base 33, the latch 36, the engaging groove 37, a spring member 38 and a lock release pin 39, which will be described later.

The mounting base 33 is formed of a rectangular flat plate extending in the upper-lower direction. The mounting base 33 is fixed to the mounting seat 28G provided on the inner surface 28F of the heat exchanger cover 28 by using bolts 33A. When the heat exchanger cover 28 is closed, the mounting base 33 is arranged in the inside of the narrow space 30. A support shaft 34 is fixed in the intermediate part of the mounting base 33 in the upper-lower direction. The support shaft 34 projects forward (to the heat exchanger 10-side) from the mounting base 33. A spring receiving plate 35 is fixed to the mounting base 33 on the lower side of the support shaft 34. A notched portion 35A is provided in the spring receiving plate 35, and one end side of the spring member 38 to be described later is hooked in the notched portion 35A.

The latch 36 is rotatably supported on the support shaft 34. The latch 36 rotates in the inside of the narrow space 30 in the upper-lower direction to cause the engaging groove 37 to be engaged to and disengaged from the fastening tool 31. The latch 36 includes a bending plate 36A formed of a plate body bent in a crank shape, and a rectangular supplementary plate 36B fixed on the bending plate 36A. The supplementary plate 36B faces a base end part 36A1 of the bending plate 36A by an interval in the front-rear direction. The base end part 36A1 of the bending plate 36A and the supplementary plate 36B are rotatably inserted in the support shaft 34 in the upper-lower direction.

An arc-shaped cam surface 36A3 is provided in a position corresponding to the fastening tool 31 on an outer peripheral edge of a tip end part 36A2 of the bending plate 36A. The cam surface 36A3 abuts on the fastening tool 31 when the heat exchanger cover 28 closes from the opened state. The tip end part 36A2 of the latch 36 rotates upward at the center of the support shaft 34 along the shape of the cam surface 36A3 to guide an open end 37A of the engaging groove 37 to be described later toward the fastening tool 31.

The engaging groove 37 is provided in the tip end part 36A2 of the bending plate 36A configuring part of the latch 36. The engaging groove 37 is engaged to the fastening tool 31. The engaging groove 37 is formed by notching a lower end edge of the tip end part 36A2 of the bending plate 36A upward. A lower end of the engaging groove 37 is formed as the open end 37A opened downward in the proximate part of the cam surface 36A3 of the bending plate 36A. Accordingly, when the heat exchanger cover 28 closes from the opened state, the tip end part 36A2 of the latch 36 gradually rotates upward at the center of the support shaft 34 along the shape of the cam surface 36A3. In addition, the tip end part 36A2 of the latch 36 rotates downward at the center of the support shaft 34 due to engagement of the open end 37A of the engaging groove 37 to the fastening tool 31. Thus, when the heat exchanger cover 28 closes from the opened state, the engaging groove 37 provided in the tip end part 36A2 of the latch 36 is automatically engaged to the fastening tool 31 fixed to the right rear leg part 14D of the support member 14. As a result, the latch 36 can hold (lock) the heat exchanger cover 28 in the closed state.

It should be noted that bolt insertion holes 33B (refer to FIG. 9) formed in the mounting base 33 each are set to have a hole diameter for forming an appropriate clearance to the bolt 33A. Thereby, even in a case where an assembly tolerance has variations at the time of mounting the heat exchanger cover 28 on the support member 14, it is possible to adjust a mounting position of the mounting base 33 to the heat exchanger cover 28. Accordingly, the fastening tool 31 provided in the support member 14 and the engaging groove 37 of the heat exchanger cover lock mechanism 32 can be easily positioned.

The spring member 38 is provided to wind around the support shaft 34 between the base end part 36A1 of the bending plate 36A and the supplementary plate 36B that configure part of the latch 36. One end 38A of the spring member 38 is hooked in the supplementary plate 36B, and the other end (not shown) of the spring member 38 is hooked in the spring receiving plate 35. The spring member 38 urges the tip end part 36A2 of the latch 36 (bending plate 36A) in a direction of rotating downward at the center of the support shaft 34. As a result, in a state where the heat exchanger cover 28 is held in the closed state, the engaging groove 37 of the latch 36 can be suppressed from being disengaged from the fastening tool 31 inadvertently.

The lock release pin 39 is positioned in the vicinity of the engaging groove 37 to be provided in the tip end part 36A2 of the bending plate 36A configuring part of the latch 36. The lock release pin 39 projects backward from the tip end part 36A2 of the bending plate 36A. The lock release pin 39 is operated upward to disengage the engaging groove 37 of the latch 36 from the fastening tool 31 against an urging force of the spring member 38.

Here, as shown in FIG. 11, in a state where both the engine cover 23 and the heat exchanger cover 28 are closed, the heat exchanger cover lock mechanism 32 is covered with the engine cover 23 from backward. At this time, the fastening tool 31, the tip end part 36A2 of the latch 36 (bending plate 36A) in which the engaging groove 37 is formed and the lock release pin 39 are arranged in the left side to the rear end 28D of the heat exchanger cover 28. Therefore, in a state where the engine cover 23 is opened upward, an operator can confirm a state where the engaging groove 37 of the latch 36 is engaged to the fastening tool 31 with a visual contact, and can easily operate the lock release pin 39 (refer to FIG. 10).

The hydraulic excavator 1 according to the present embodiment has the configuration as described above, and next, an operation thereof will be explained.

The small-sized hydraulic excavator 1 a total weight of which is approximately 0.7 to 8 tons is transported to a working site in a state of being loaded on a loading platform of the small-sized truck. When the hydraulic excavator 1 is transported to the working site, an operator gets in the inside of the cab 15 to operate the lever/pedal for travel and the operating lever for work (any of them is not shown) arranged in the inside of the cab 15. Accordingly, the hydraulic excavator 1 self-travels to the desired working site, and after that, performs a demolition work of the inside of a building, a side ditch digging work in a narrow urban area and the like and an excavating work of earth and sand.

Here, the hydraulic excavator 1 has a length dimension of the cab 15 in the front-rear direction that is for example, 70% to 90% or more of a length dimension of the upper revolving structure 4 in the front-rear direction. Therefore, the hydraulic excavator 1 can enhance occupant comfort in the inside of the cab 15. In addition, the left corner part and the right corner part of the counterweight 7 are chamfered in an arc shape, and the left corner part of the left rear cover 22 and the right corner part of the heat exchanger cover 28 configuring part of the exterior cover 19 are chamfered in an arc shape. Therefore, when the upper revolving structure 4 is revolved, the counterweight 7 and the exterior cover 19 can be suppressed from colliding with surrounding structures, stumpages and the like.

Here, in the hydraulic excavator 1 according to the present embodiment, the front end 28C of the heat exchanger cover 28 covering the heat exchanger 10 is mounted to the support member 14 through the hinge member 29. Therefore, the heat exchanger cover 28 is formed of a horizontal-opening structure in which the rear end 28D as the free end is rotatable in the front-rear direction on a basis of the front end 28C.

In contrast thereto, in the present embodiment, as shown in FIG. 2 and FIG. 11, in a case where both the engine cover 23 and the heat exchanger cover 28 are closed, the rear end 28D of the heat exchanger cover 28 and the heat exchanger cover lock mechanism 32 are covered with the engine cover 23 from backward. Accordingly, even if the rear end 28D of the heat exchanger cover 28 will rotate in the front-rear direction on a basis of the front end 28C, the rear end 28D of the heat exchanger cover 28 abuts on the right end 23B of the engine cover 23.

Accordingly, as long as the engine cover 23 holds the closed state by the engine cover lock mechanism 24, it is possible to suppress the heat exchanger cover 28 from opening inadvertently. As a result, even if the heat exchanger cover lock mechanism 32 is out of order, there is no possibility that the heat exchanger cover 28 opens inadvertently by a revolving movement of the upper revolving structure 4. Accordingly, since it is possible to prevent the heat exchanger cover 28 from colliding with objects existing in the circumference of the hydraulic excavator 1, it is possible to protect the heat exchanger cover 28.

In addition, according to the present embodiment, in a state where both the engine cover 23 and the heat exchanger cover 28 are closed, the narrow space 30 surrounded by the engine cover 23, the heat exchanger cover 28 and the partition member 17 is formed closer to the rear side than the heat exchanger 10. The heat exchanger cover lock mechanism 32 is accommodated in the narrow space 30. In the small-sized hydraulic excavator 1, since the cab 15 is arranged to cover the engine 8 and the heat exchanger 10 from the upper side, the equipment device accommodating space on the revolving frame 6 becomes narrow. In the present embodiment, however, it is possible to provide the heat exchanger cover lock mechanism 32 effectively utilizing the narrow space 30 that is usually supposed to be a dead space.

Figure 10:
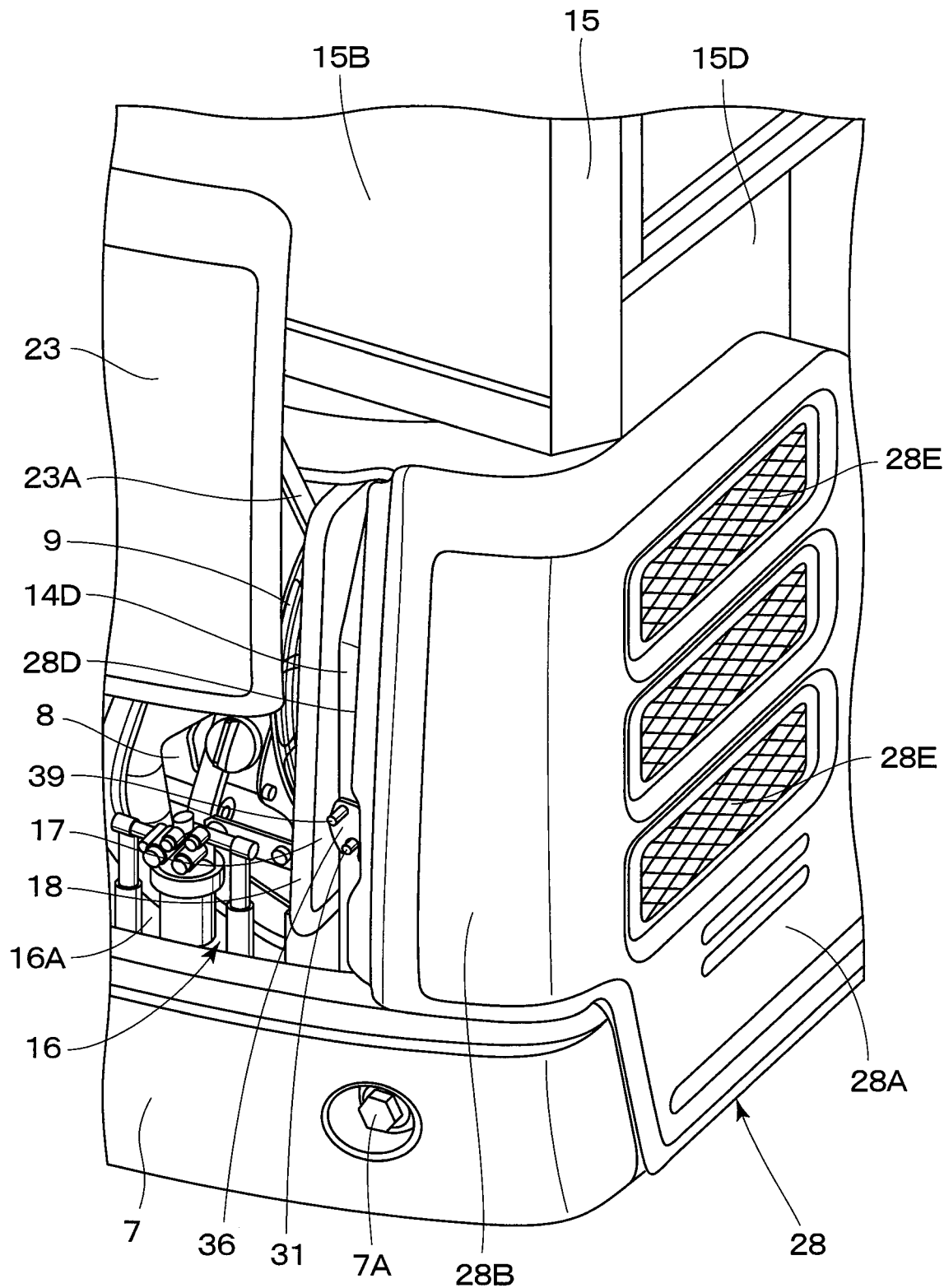
FIG. 10 is a perspective view showing a state where the engine cover is opened to operate the lock mechanism.

Further, as shown in FIG. 11, in a state where both the engine cover 23 and the heat exchanger cover 28 are closed, the fastening tool 31 accommodated in the narrow space 30, the tip end part 36A2 of the latch 36 in which the engaging groove 37 is formed and the lock release pin 39 are arranged in the left side to the rear end 28D of the heat exchanger cover 28. Therefore, as shown in FIG. 10, in a state where the engine cover 23 is opened upward, an operator can confirm a state where the engaging groove 37 of the latch 36 is engaged to the fastening tool 31 with a visual contact. In addition, an operator operates the lock release pin 39 to easily release a lock state of the heat exchanger cover 28, making it possible to quickly open the heat exchanger cover 28. As a result, when an operator performs a maintenance work to the heat exchanger 10 and the like accommodated in the inside of the heat exchanger room 16B, it is possible to enhance the workability.

Further, in a state where the engine cover 23 is closed, the heat exchanger cover lock mechanism 32 provided in the heat exchanger cover 28 can be covered and hidden with the engine cover 23. As a result, the heat exchanger cover 28 can be shown in a neat and fine form to enhance outside appearance quality (outside appearance beauty) of the hydraulic excavator 1.

In addition, in the present embodiment, the partition member 17 is formed as a part of the frame body 11 of the heat exchanger 10 and integrally with the frame body 11. The partition member 17 is provided between the engine room 16A and the heat exchanger room 16B in the circumference of the heat exchanger 10. Thereby, in a state where both the engine cover 23 and the heat exchanger cover 28 are closed, the heat exchanger room 16B is partitioned from the engine room 16A by the partition member 17.

Accordingly, the cooling air sucked in by the cooling fan 9 passes through the heat exchanger 10, and thereby, is supplied to the engine room 16A from the heat exchanger room 16B. At this time, the partition member 17 blocks the cooling air from penetrating into the heat exchanger room 16B from the engine room 16A. As a result, it is possible to prevent the cooling air a temperature of which has increased in the engine room 16A from penetrating into the heat exchanger room 16B to supply a low-temperature cooling air into the heat exchanger room 16B.

In addition, in the present embodiment, the narrow space 30 is formed as a space surrounded by the extension part 23C of the engine cover 23 in the closed state that extends from the partition member 17 to the heat exchanger room 16B-side, the extension part 28H of the heat exchanger cover 28 in the closed state that extends closer to the rear side than the rear end (rear plate 11B of the frame body 11) of the heat exchanger 10 and the extension part 17A of the partition member 17 that extends closer to the rear side than the rear end of the heat exchanger 10. Accordingly, it is possible to arrange the heat exchanger cover lock mechanism 32 effectively utilizing the narrow space 30 that is usually supposed to be a dead space.

In addition, in the present embodiment, the support member 14 is provided in the rear side of the revolving frame 6 to support the rear side of the cab 15 and the fastening tool 31 is provided in the support member 14 to project into the narrow space 30. The heat exchanger cover lock mechanism 32 is configured to hold the heat exchanger cover 28 in the closed state by being engaged to the fastening tool 31 at the time of closing the heat exchanger cover 28. Accordingly, when the heat exchanger cover 28 is closed from the opened state, the engaging groove 37 provided in the tip end part 36A2 of the latch 36 (bending plate 36A) is automatically engaged to the fastening tool 31. As a result, when the heat exchanger cover 28 moves to the closed position, it is possible to automatically hold the heat exchanger cover 28 in the closed state by the heat exchanger cover lock mechanism 32.

In addition, in the present embodiment, the heat exchanger cover lock mechanism 32 includes the mounting base 33 of the heat exchanger cover 28 that is provided on the inner surface 28F of the heat exchanger cover 28 positioned in the inside of the narrow space 30, the latch 36 that is supported on the mounting base 33 through the support shaft 34 and is rotatable in the upper-lower direction in the inside of the narrow space 30, the engaging groove 37 that is provided in the latch 36 and is engaged to the fastening tool 31 and the lock release pin 39 that is positioned in the vicinity of the engaging groove 37 and is provided in the latch 36 to be operated for disengaging the engaging groove 37 from the fastening tool 31. Accordingly, when the engaging groove 37 provided in the latch 36 is engaged to the fastening tool 31, the heat exchanger cover 28 is locked to the closed position. In addition, the lock state of the heat exchanger cover 28 is released by operating the lock release pin 39 to disengage the engaging groove 37 of the latch 36 from the fastening tool 31.

It should be noted that the embodiment is explained by taking the small-sized hydraulic excavator 1 provided with the working mechanism 5 for an excavating work including the bucket 5D as a small-sized construction machine, as an example. However, the present invention is not limited thereto, but may be applied to a small-sized hydraulic excavator provided with working tools other than the bucket, such as grapples and rock drills and the like.

DESCRIPTION OF REFERENCE NUMERALS

1: Hydraulic excavator (Small-sized construction machine)
2: Lower traveling structure
4: Upper revolving structure
5: Working mechanism
6: Revolving frame
7: Counterweight
8: Engine
9: Cooling fan
10: Heat exchanger
11B: Rear plate (Rear end of heat exchanger)
14: Support member
15: Cab
15B: Rear surface part (Rear surface)
15F: Recessed part
16: Equipment device accommodating room
16A: Engine room
16B: Heat exchanger room
17: Partition member
17A, 23C, 28H: Extension part
23: Engine cover
28: Heat exchanger cover
28D: Rear end 28F: Inner surface
30: Narrow space
31: Fastening tool
32: Heat exchanger cover lock mechanism (Lock mechanism)
33: Mounting base
34: Support shaft
36: Latch
37: Engaging groove
39: Lock release pin

The invention claimed is:

1. A small-sized construction machine comprising:
an automotive lower traveling structure;
an upper revolving structure that is rotatably mounted on said lower traveling structure; and
a working mechanism that is provided in the front side of said upper revolving structure, wherein
said upper revolving structure includes:
a revolving frame that is formed as a support structural body;
a counterweight that is mounted in the rear side of said revolving frame for acting as a weight balance to said working mechanism;
an engine that is positioned in the front side to said counterweight and is mounted on said revolving frame in a horizontal state of extending in a left-right direction;
a cooling fan that is provided on one side of said engine in the left-right direction to suck in outside air as cooling air;
a heat exchanger that is positioned upstream of said cooling fan in a flow direction of the cooling air and is mounted on said revolving frame to cool fluid by the cooling air;
a stepped boxy cab that is provided on said revolving frame and has a recessed part formed by notching a rear side of a side surface and a rear surface;
an engine cover that is provided between said counterweight and the rear surface of said cab to be capable of opening/closing in an upper-lower direction for inspection of said engine; and
a heat exchanger cover that is provided between the rear side of the side surface of said cab and said revolving frame to be capable of opening/closing for inspection of said heat exchanger, characterized in that:
said heat exchanger cover is formed of a horizontal-opening structure of being rotatable to said revolving frame with a front end in a front-rear direction as a fulcrum and a rear end in the front-rear direction as a free end; and
a lock mechanism is provided on a rear end side of said heat exchanger cover to hold said heat exchanger cover in a closed state, wherein
in a state where both said heat exchanger cover and said engine cover are closed, said engine cover covers the rear end of said heat exchanger cover and said lock mechanism from behind,
wherein said lock mechanism includes:
a mounting base that is provided on an inner surface of said heat exchanger cover;
a latch that is supported on said mounting base through a support shaft and is rotatable in an upper-lower direction;
an engaging groove that is provided in said latch and is engaged to a fastening tool;
and
a lock release pin that is positioned in the vicinity of said engaging groove and is provided in said latch to be operated for disengaging said engaging groove from said fastening tool.

2. The small-sized construction machine according to claim 1, wherein
a partition member is provided in a circumference of said heat exchanger for partition between an engine room in which said engine is accommodated and that is opened/closed by said engine cover and a heat exchanger room in which said heat exchanger is accommodated and that opened/closed by said heat exchanger cover, wherein
in a state where both said engine cover and said heat exchanger cover are closed, cooling air having entered into said heat exchanger room passes through said heat exchanger and then, flows toward said engine room.

3. The small-sized construction machine according to claim 2, wherein
a narrow space is formed closer to a rear side than said heat exchanger, the narrow space being surrounded by said engine cover, said heat exchanger cover and said partition member in a state where said engine cover and said heat exchanger cover are closed, wherein
said lock mechanism is accommodated in the inside of said narrow space.

4. The small-sized construction machine according to claim 3, wherein
said narrow space includes a space that is surrounded by a part of said engine cover in the closed state extending to said heat exchanger room-side from said partition member, apart of said heat exchanger cover in the closed state extending closer to the rear side than the rear end of said heat exchanger and a part of said partition member extending closer to the rear side than the rear end of said heat exchanger.

5. The small-sized construction machine according to claim 3, wherein
a support member is provided in the rear side of said revolving frame to support the rear side of said cab, and
the fastening tool projecting into said narrow space is provided in said support member, wherein
said lock mechanism is engaged to said fastening tool at the time of closing said heat exchanger cover to hold said heat exchanger cover in the closed state.

* * * * *